(12) United States Patent
Coelho et al.

(10) Patent No.: US 6,347,340 B1
(45) Date of Patent: Feb. 12, 2002

(54) APPARATUS AND METHOD FOR CONVERTING A NETWORK MESSAGE TO A WIRELESS TRANSPORT MESSAGE USING A MODULAR ARCHITECTURE

(75) Inventors: David R. Coelho, Los Altos Hills; David B. Bernstein, San Mateo, both of CA (US)

(73) Assignee: Mobilesys, Inc., Mountain View, CA (US)

(*) Notice: Subject to any disclaimer, the term of this patent is extended or adjusted under 35 U.S.C. 154(b) by 0 days.

(21) Appl. No.: 09/507,304

(22) Filed: Feb. 18, 2000

(51) Int. Cl.$^7$ .............................................. G06F 15/16
(52) U.S. Cl. ...................... 709/246; 370/913
(58) Field of Search ................................ 370/408, 466, 370/467, 913; 707/103; 709/203, 237, 246, 206, 103

(56) References Cited

U.S. PATENT DOCUMENTS

| | | | | |
|---|---|---|---|---|
| 4,953,106 A | * | 8/1990 | Gansner et al. ............. | 364/521 |
| 5,432,852 A | * | 7/1995 | Leighton et al. ............. | 380/30 |
| 5,577,202 A | * | 11/1996 | Padgett ...................... | 709/206 |
| 5,610,904 A | * | 3/1997 | Eng et al. .................... | 370/408 |
| 5,765,109 A | * | 6/1998 | Chavez, Jr. .................. | 455/435 |
| 5,809,028 A | * | 9/1998 | Nethercott et al. ......... | 370/467 |
| 5,826,039 A | * | 10/1998 | Jones ......................... | 709/206 |
| 5,912,897 A | * | 6/1999 | Steinbach ................... | 370/467 |
| 5,944,823 A | * | 8/1999 | Jade et al. .................. | 713/201 |
| 5,966,656 A | * | 10/1999 | Elkin et al. ................. | 455/421 |
| 5,983,265 A | * | 11/1999 | Martino, II ................. | 709/206 |
| 6,023,723 A | * | 2/2000 | McCormick et al. ........ | 709/206 |
| 6,219,667 B1 | * | 4/2000 | Lu et al. ....................... | 707/9 |
| 6,215,495 B1 | * | 4/2001 | Grantham et al. .......... | 345/419 |

OTHER PUBLICATIONS

Padcom, "Intelligent Mobile Routing—An Overview", PADCOM Inc., 12 pages.*
Mobile Computing, www.peterindia.com, 5 pages.*
Lucent Technology, "Wireless Data Delivery Application", 2 pages.*

* cited by examiner

Primary Examiner—Le Hien Luu
Assistant Examiner—Bunjob Jaroenchonwanit
(74) Attorney, Agent, or Firm—Pennie & Edmonds LLP (57) ABSTRACT

A system to convert a network message into a wireless transport message includes a network-to-wireless transformation database with a message configuration table. An expansion agent processes a network message received from a computer network and information from the message configuration table to create a wireless transport message. The wireless transport message specifies attributes to facilitate the delivery of the network message to a wireless device. The attributes include a selected wireless message transport protocol and a selected wireless message transport conduit.

30 Claims, 5 Drawing Sheets

APPARATUS AND METHOD FOR CONVERTING A NETWORK MESSAGE TO A WIRELESS TRANSPORT MESSAGE USING A MODULAR ARCHITECTURE

BRIEF DESCRIPTION OF THE INVENTION

This in invention relates generally to the conversion of computer network messages into messages that can be delivered to a wireless device. More particularly, this invention relates to a technique for converting a network message to a wireless transport message in a modular architecture that enhances system scaling, capacity, and performance.

BACKGROUND OF THE INVENTION

Systems to convert computer network messages into messages that can be delivered to a wireless device (e.g., a pager, a cellular telephone, a personal communications services (PCS) device, and the like) are known in the art. MobileSys, Inc. of Mountain View, Calif. (www.mobilesys.com), the assignee of the present invention, is a leading vendor of such systems.

A problem with current systems is that they are written as monolithic programs. Thus, it is difficult to modify these prior art systems to support changing system architectures and communication standards. For example, there are different conduits through which a computer network message is sent to wireless device. These conduits, referred to at times as wireless message transport conduits, include modems, the Internet, X.25, TTY, and TCP transport architectures. Each wireless message transport conduit must support multiple communication protocols, referred to at times as wireless message transport protocols. For example, a wireless message transport conduit must support the TAP protocol for one way alphanumeric paging, the Touch Tone protocol for tone numeric paging, the SNPP protocol for Internet paging, various proprietary two-way SMS protocols for digital cellular telephones, and the like.

It is becoming increasingly difficult to support the proliferating number of wireless message transport conduits and wireless message transport protocols. Modifying a monolithic program to support these proliferating conduits and protocols is labor-intensive and error-prone, since the entire program must be analyzed and a bug in a single portion of the program may bring the entire system down.

In view of the foregoing, it would be highly desirable to provide an improved technique for converting a network message into a wireless transport message. Ideally, the technique would be modular for improved scaling, capacity, and performance.

SUMMARY OF THE INVENTION

A system to convert a network message into a wireless transport message includes a network-to-wireless transformation database with a message configuration table. An expansion agent processes a network message received from a computer network and information from the message configuration table to create a wireless transport message. The wireless transport message specifies attributes to facilitate the delivery of the network message to a wireless device. The attributes include a selected wireless message transport protocol and a selected wireless message transport conduit.

The method of the invention involves converting a network message into a wireless transport message. The method includes the steps of receiving a network message and linking information within the network message with information in a database to form a Directed Acyclic Graph defining attributes to facilitate delivery of the network message to a wireless device. Attributes are then selected from the Directed Acyclic Graph to form a wireless transport message specifying a wireless message transport protocol and a wireless message transport conduit.

The invention provides an improved technique for converting a network message into a wireless transport message. In particular, the invention provides a modular system that easily scales to support additional wireless message transport protocols and conduits. This modular system provides enhanced capacity and performance for a wireless messaging engine architecture.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
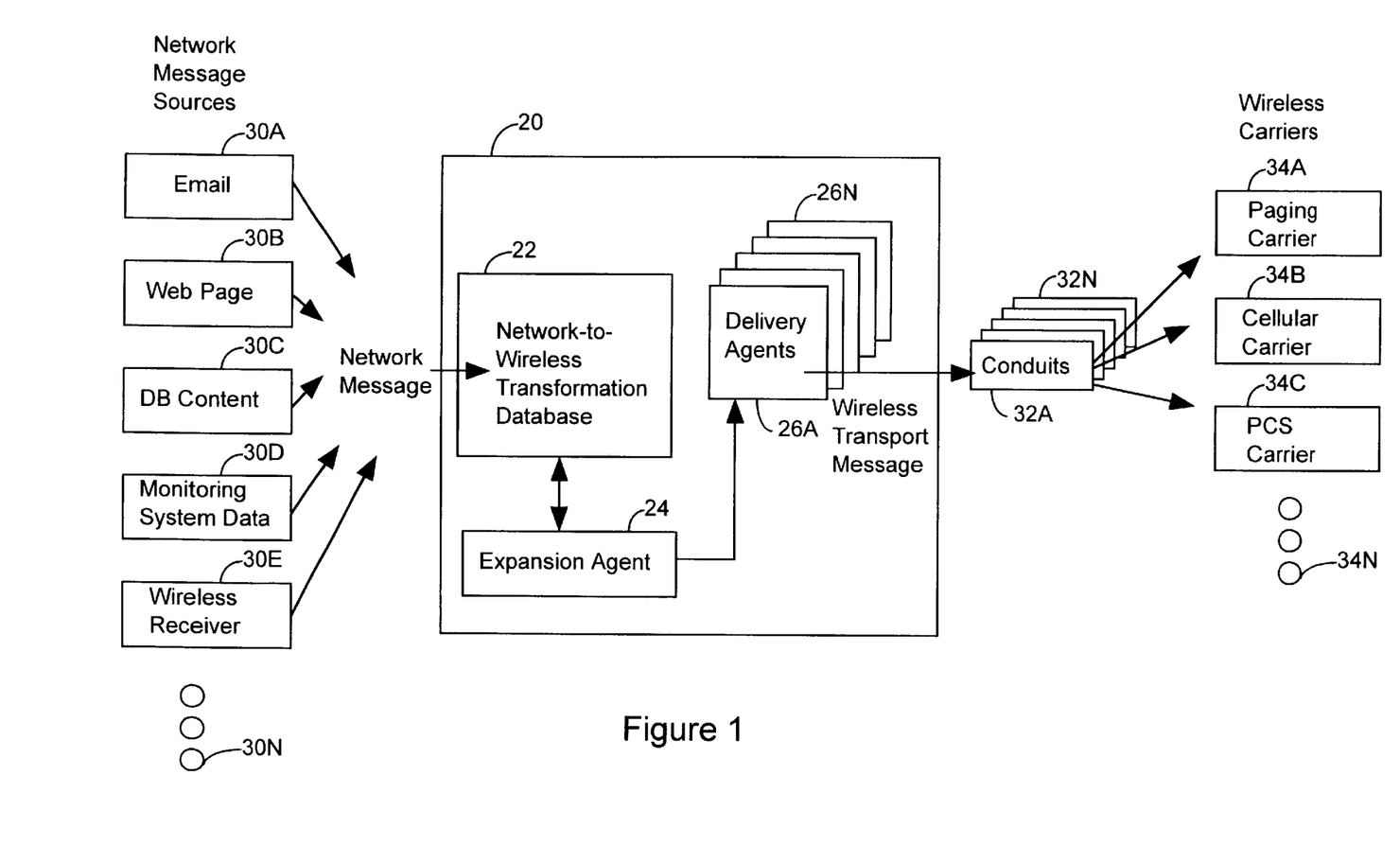
FIG. 1 illustrates a messaging system constructed in accordance with an embodiment of the invention.

FIG. 1 is a simplified illustration of a messaging system 20 constructed in accordance with an embodiment of the invention. The messaging system 20 includes a network-to-wireless transformation database 22, an expansion agent 24, and a set of delivery agents 26A–26N.

A variety of network message sources 30A–30N may be used to deliver a network message to the messaging system 20. As shown in FIG. 1, the network messaging sources may include an email 30A, a web page 30B, database content 30C, monitoring system data 30D, data from a wireless receiver 30E, and similar sources. Each network messaging source provides content that is routed through a network (e.g., the Internet, an Intranet, a local area network, and the like), The content of the network message is formatted in accordance with technique described below. As long as the content is formatted in this manner, the network message source for the content may originate on any type of digital device. Thus, as shown in FIG. 1, the network message may actually be a wireless message received at the wireless receiver 30E, which is then routed to the messaging system 20. Observe that this allows for two-way messaging as a wireless device can route a message to a wireless receiver 30E, which applies it to the messaging system 20, allowing the message to be sent to another wireless device.

A network message is sent to the network-to-wireless transformation database 22. The expansion agent 24 processes the message and information within the database 22 to create a wireless transport message specifying a set of attributes that facilitate the delivery of the message to a wireless device. These attributes include a wireless message transport protocol and a wireless message transport conduit. The wireless transport message is then stored in the database 22 until it is processed by a delivery agent 26. Each delivery agent 26 supports a pre-determined wireless message transport protocol and a pre-determined wireless message transport conduit. Therefore, as new wireless transport protocols and conduits are defined, the system can be updated by adding additional delivery agents 26 and by providing additional configuration information to the database 22.

As shown in FIG. 1, each delivery agent 26 delivers a wireless transport message to its corresponding conduit 32. The conduit 32 then delivers the wireless transport message to a wireless carrier 34 using conventional techniques. The wireless carrier 36 subsequently sends the message in accordance with conventional techniques. As shown by way of example, the wireless carriers may include a paging carrier 34A, a digital cellular carrier 34B, and PCS carrier 34C, among others.

Thus, FIG. 1 illustrates the environment in which the messaging system 20 of the invention operates. Technical details directed toward the various network message sources 30 and wireless carriers 34 that can be used in connection with the invention are known. Therefore, the following discussion focuses exclusively upon the operation of the messaging system 20.

Figure 2:
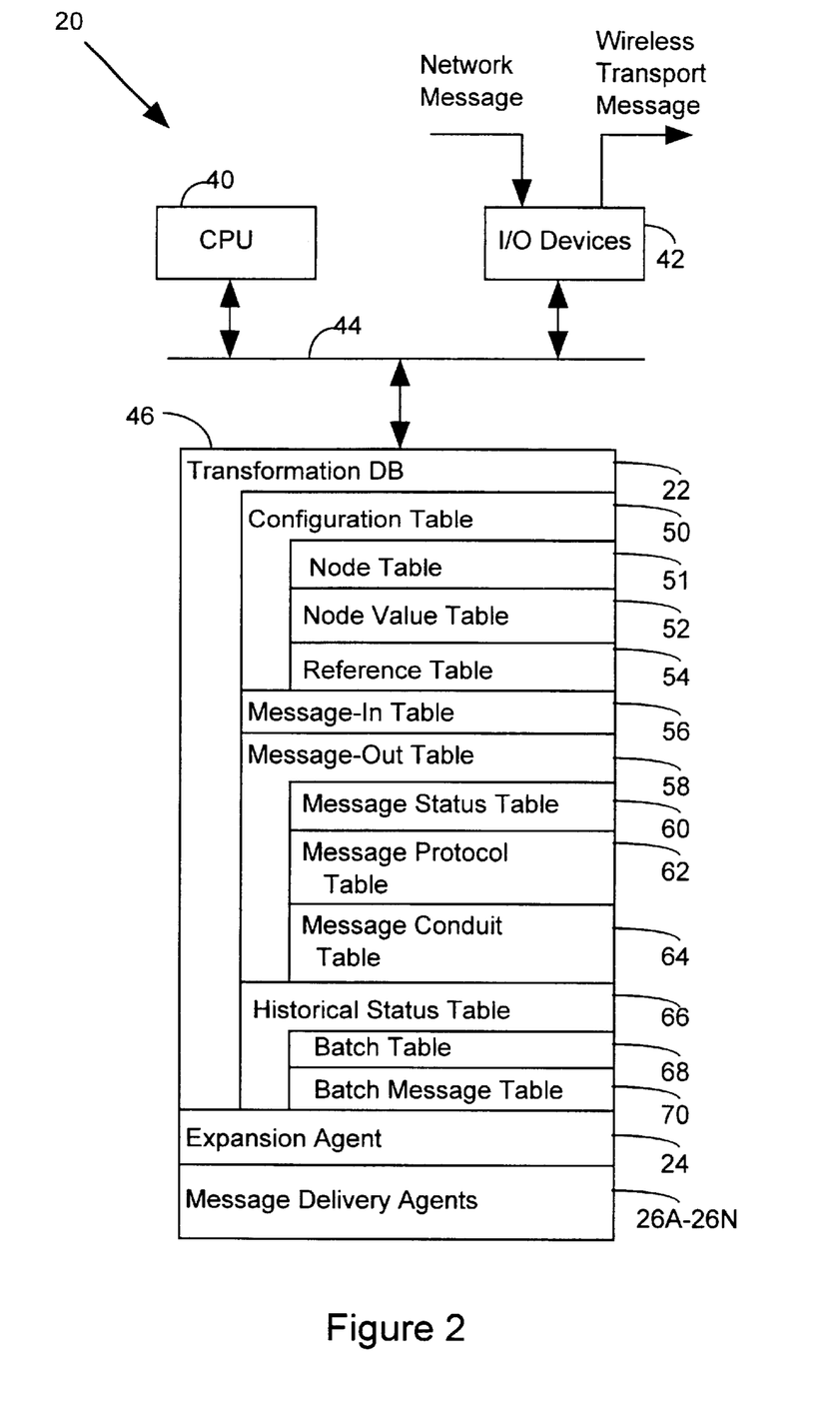
FIG. 2 illustrates a messaging system of the invention implemented in a general purpose computer.

FIG. 2 illustrates that the messaging system 20 may be implemented with a general purpose computer including a central processing unit 40 and standard input/output devices 42. The input/output devices 42 include a keyboard, mouse, video monitor, at least one node to receive a network message, and at least one node to launch a wireless transport message. A system bus 44 links the central processing unit 40 and the input/output devices 42. Also connected to the system bus 44 is a memory 46. The memory 46 stores data and executable programs used to implement the technique of the invention. In particular, the memory 46 stores a transformation database 22, which may be a Structured Query Language (SQL) database. The database 22 includes a configuration table 50, which includes a node table 51, a node value table 52, and a reference table 54. Multiple configuration tables 50 and multiple node tables 51, node value tables 52, and reference tables 54 may be used to implement the invention. However, to simplify the description of the invention, reference is made to individual tables instead of sets of tables. As discussed below, the configuration table data structures store information that can be quickly converted into directed acyclic graphs to facilitate the process of ascribing settings to a wireless transport message.

A message-in table 56 is also associated with the transformation database 22. The message-in table 56 stores received network messages. A message-out table 58 is also provided. The message-out table 58 stores messages after being processed by the expansion agent 24 and prior to being delivered by the message delivery agents 26. The message-out table 58 includes a message status table 60, a message protocol table 62, and a message conduit table 64. Multiple message-out tables 58, and multiple message status tables 60, message protocol tables 62, and message conduit tables 64 may be used to implement the invention. However, to simplify the description of the invention, reference is made to individual tables instead of sets of tables.

The memory 46 also stores an historical status table 66, which includes information on the status of pending and delivered messages processed by the message-in table 56 and the message-out table 58. This information is stored in a batch table 68 and a batch message table 70, as discussed below.

The expansion agent 24 is also stored in the memory 46. The expansion agent is a set of executable code written to implement the operations of parsing an incoming message and then building a directed acyclic graph using the incoming message information and information from the configuration table 50. The directed acyclic graph is then processed by the expansion agent 24 to select attributes to facilitate delivery of the network message to a wireless device. The selected attributes and the data content from the network message result in a wireless transport message that is directed by the expansion agent 24 to the message-out table 58.

The message delivery agents 26A–26N process the messages stored in the message-out table 58. Each delivery agent 26 includes a set of executable code that defines a selected wireless message transport protocol and a wireless message transport conduit. Messages in the message-out table 58 that correspond to the selected wireless message transport protocol and wireless message transport conduit of a given delivery agent are processed by the delivery agent.

Figure 3:
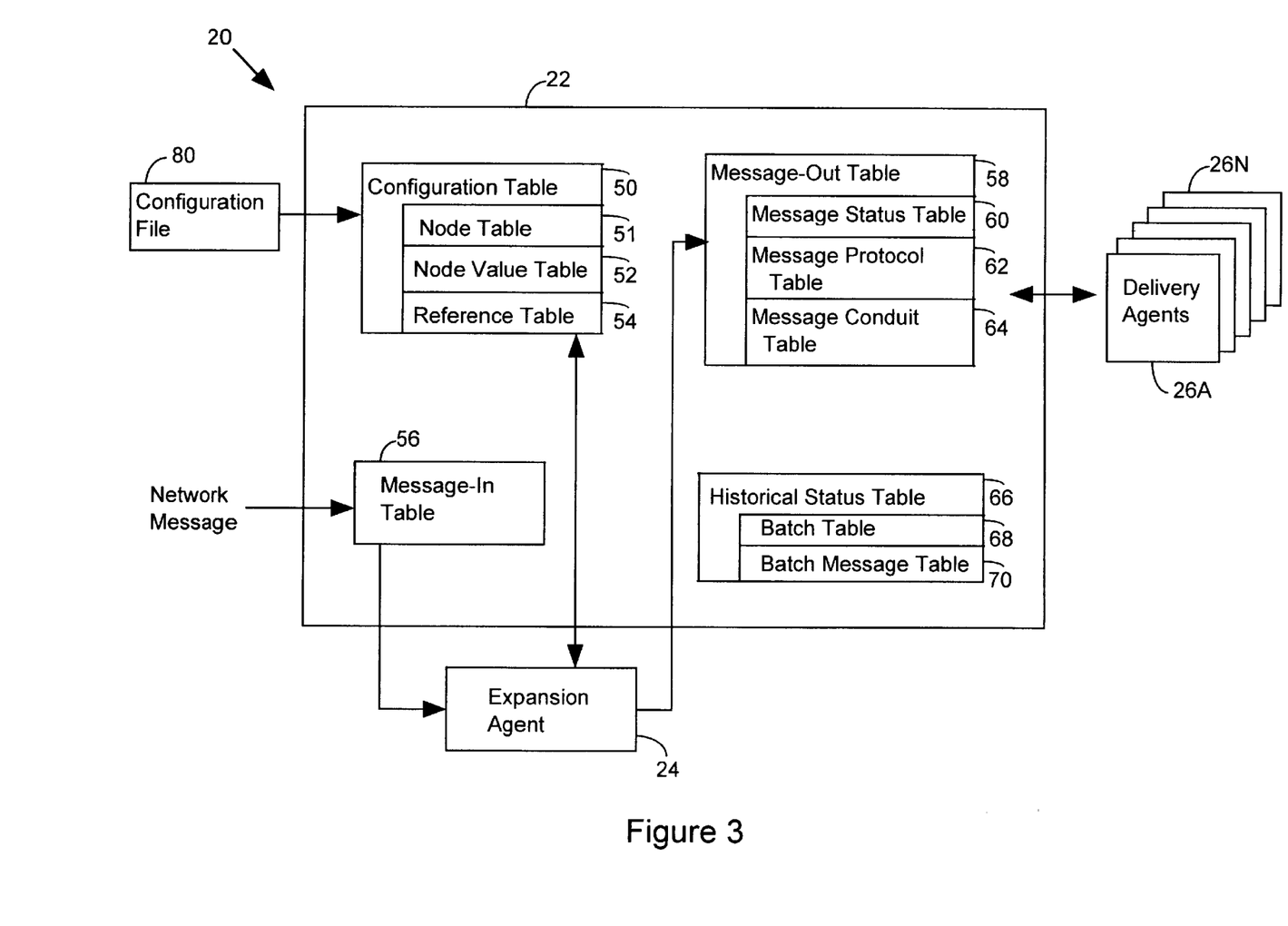
FIG. 3 illustrates the interactions between various messaging system modules of the invention.

The interaction between the various executable modules and data structures of the invention are more fully appreciated in connection with FIG. 3. FIG. 3 illustrates a messaging engine 20, which includes a transformation database 22, an expansion agent 24, and a set of delivery agents 26A–26N. A configuration file 80 is used to configure the configuration table 50, which includes a node table 51, a node value table 52, and a reference table 54. The message-in table 56 stores a received network message until the expansion agent 24 can process it. The expansion agent processes the message and information in the configuration table to create a wireless transport message specifying a selected wireless message transport protocol and a wireless message transport conduit. The resultant wireless transport message is routed to the message-out table 58.

The delivery agents 26A–26N select messages for routing in accordance with a pre-defined wireless message transport protocol and wireless message transport conduit. The historical status table 66 stores information regarding the delivery status of messages within the message-out table 58.

The foregoing description of the primary operations associated with the invention is more fully appreciated in connection with the following discussion of a detailed embodiment of the invention. As previously indicated, the configuration table 50 includes a node table 51, a node value table 52, and a reference table 54. Detailed information about the recipients, services, agents, and licenses associated with the system are stored in these tables. For each unique recipient service, agent or license code there is an entry in the node table 51. Each entry in the node table 51 has a unique node index, and values for fields node_id, node_name, node_class, and node_priority, as shown in Table 1 below.

TABLE 1

| field | value |
| --- | --- |
| node_index | unique integer |
| node_id | user-defined shortname |
| node_name | descriptive name for node |

TABLE 1-continued

| field | value |
| --- | --- |
| node_class | class values include: "default", "recipient", "service", "agent", "license" |
| node_priority | integer, used in determining final configuration |

Figure 4:
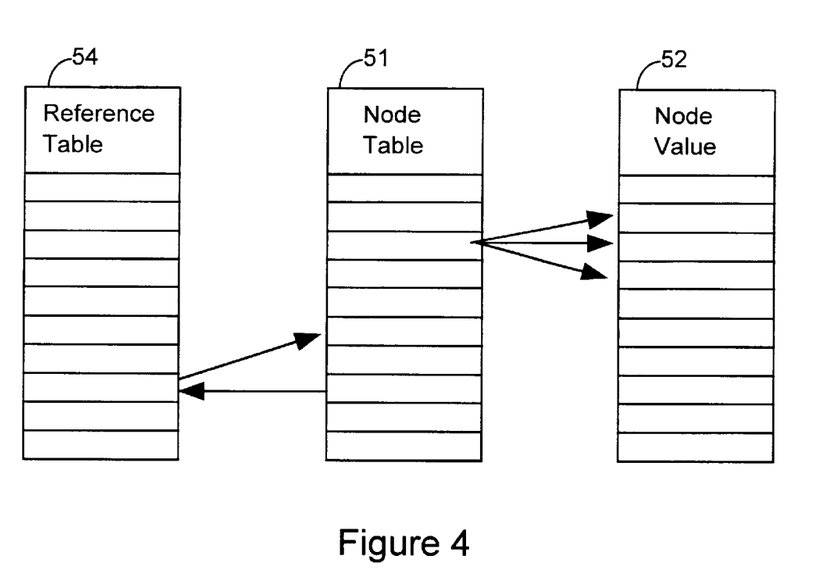
FIG. 4 illustrates configuration table data structures utilized in accordance with an embodiment of the invention.

Each node (entry) in the node table is further elaborated in the node value table 52. Each characteristic of a node is defined in the node value table. There can be many entries in the node value table that correspond to the same node. For example, a node with a node_class "service" may have node value entries for its phone number, dialing prefix, and modem initialization string. This is illustrated in connection with FIG. 4. FIG. 4 illustrates a node table 51. A single entry of the node table 51 (e.g., node_class) points to several node values in table 52. Each node value may be defined with the data structure shown in Table 2.

TABLE 2

| field | value |
| --- | --- |
| node_index | corresponds to node_index in node table |
| nodevalue_code | integer representing node characteristic |
| nodevalue_value | value for given node characteristic |

The configuration table 50 also includes a reference table 54. The reference table 54 allows one node to reference another node. For example, if a recipient node wanted to use the information already defined in a service node, this "referenced" node would be stored in the reference table. This process of using a reference table 54 to allow two nodes to refer to one another is illustrated in FIG. 4. The reference table may defined in accordance with Table 3.

TABLE 3

| field | values |
| --- | --- |
| node_index | matches the parent node_index |
| reference_index | matches the node_index of referenced node |
| reference_type | type of reference: "merge" or "expand" |

There are currently two types of referenced nodes: "merge" and "expand". If a node is referencing another node in order to complete its definition, then it is using a "merge" reference. If a node is a collection of expand references, each reference node is processed individually. For example, a group of recipient nodes would be processed individually.

The utilization of the configuration table 50 will be discussed further below. Until then, the remaining features of the database 22 are discussed. The message-in table 56 receives incoming messages from various input sources. In the following discussion the message-in table is sometimes written in a shorthand manner as "msgin". This table's main field is called msgin_xml, which is an unstructured, arbitrary sized field. The actual message along with descriptive information in Extensible Markup Language (XML) format is dropped in this msgin_xml field. The expansion agent 24 detects this entry in msgin and processes it, as discussed further below. The message-in table 56 may have the form described in Table 4.

TABLE 4

| field | value |
| --- | --- |
| msgin_index | a unique integer used to track message |
| msgin_acceptTime | time message was dropped into msgin table |
| msgin_xml | message and destination info in XML format |

The message-out table 58 includes a message queue, a message status table 60, message protocol settings 62 and message conduit settings 64. The message queue and message status are stored in the message status (msgstatus) table 60; each message has an entry in the msgstatus table 60 along with an entry in a protocol table 62 and an entry in a conduit table 64. The protocol and conduit tables specify a message protocol and message conduit. For example, a message that will be delivered via the TAP protocol and a modem conduit will have an entry in the msgstatus, msgtap and msgmodem tables. The message status table 60 may be defined with the parameters set forth in Table 5.

TABLE 5

| field | value |
| --- | --- |
| msgstatus_index | unique integer in msgstatus table |
| msgin_index | unique integer, same as msgin table's msgin_index |
| msgstatus_id | user-defined id number, specified via XML |
| msgstatus_msgpriority | message priority, specified via config or msg XML |
| msgstatus_msggroup | message group the message belongs to; determines which agent may deliver it |
| msgstatus_message | the actual message text |
| msgstatus_attachment | arbitrary attachment to message, not delivered |
| msgstatus_status | current status of message, including queued, delivered, processing, retry error, outright error |
| msgstatus_errorSummary | error message |
| msgstatus_errorCode | numeric code corresponding to error |
| msgstatus_deliveryAttempt | number of unsuccessful attempts to carrier |
| msgstatus_connectAttempt | number of unsuccessful conduit connections |
| msgstatus_acceptTime | time message was dropped into msgin table |
| msgstatus_queuedTime | time message was transferred to outgoing tables |
| msgstatus_updateTime | time message information was last updated |
| msgstatus_deliverTime | time message was delivered to carrier |
| msgstatus_protocol | delivery protocol for message |
| msgstatus_conduit | deliver conduit for message |
| msgstatus_agentId | the last agent to attempt deliver of message |
| msgstatus_recipient | unique identification of end device |
| msgstatus_service | connection string for carrier (phone, address, . . .) |
| msgstatus_checksum | licensing checksum value |

A delivery agent 26 is used for each unique protocol/conduit supported in the given installation. The delivery agent 26 examines the message status table 60 for queued messages that can be delivered, and updates the message status entries for messages that have been delivered and for messages that have failed to be delivered. There is no limit to the number of delivery agents 26 that can run concurrently. In addition to examining the message status table 60, the delivery agent 26 also examines the message's entry in the message protocol table 62 and message conduit table 64 in order to customize the protocol and conduit to that particular message's requirements.

The historical status table 66 includes a batch table 68 and a batch message table 70 (batchmsg). A "batch" is a delivery attempt to a given carrier. For each delivery attempt, one entry will be inserted into the batch table 68, and one or more entries into the batch message table (one for each message) 70. These tables provide a detailed historical log of message status and carrier connection status. The batch table 68 may be defined in accordance with Table 6, while the batch message table may be defined in accordance with Table 7.

TABLE 6

| field | value |
|---|---|
| batch_index | unique integer |
| batch_attemptTime | time batch was attempted |
| batch agent_Id | delivery agent who made attempt value |

TABLE 7

| field | value |
|---|---|
| batch_index | unique integer |
| msgstatus_index | msgstatus_index of given message |
| msgstatus_status | resulting status from batch connection |
| msgstatus_errorSummary | if error, error summary |
| msgstatus_errorCode | if error, integer code |
| msgstatus_deliveryAttempt | number of delivery attempts of given message |
| msgstatus_connectAttempt | number of connection attempts for given message |

Each element of the transformation database 22 has now been described. Attention presently turns to a description of a configuration file 80 used to configure the transformation database 22 and a network message processed in accordance with the invention. The configuration file 80 and incoming network messages are preferably specified using the Extensible Markup Language (XML) textual format. In the case of the configuration file 80, a program may be used to translate the XML into the various database tables of the transformation database 22.

The XML syntax is based on tags that describe data. For every piece of discrete data there is a tag to define its meaning. The XML tags used in accordance with the invention are defined in a Document Type Definition (DTD).

In general, an XML tag has the format: <tag>value</tag>. The <tag> defines the data type. The DTD of the present invention is organized in a two-level hierarchical format. The first level is the node tag. The second level defines a characteristic of the node, as shown, for example, in Table 8.

TABLE 8

```
<node>
    <characteristic1>
        <characteristic1_detail1>value</characteristic1_detail1>
        <characteristic1_detail2>value</characteristic1_detail2>
    </characteristic1>
    <characteristic2>
        <characteristic2_detail1>value</characteristic2_detail1>
    </characteristic2>
</node>
```

The configuration table 50 is a collection of nodes, each defined by a node tag. Each node is uniquely identified with an id, class, name and priority. The node tag may be defined as follows:

<node id="unique_value" class="allowable_value" name="userdefined_value" priority="integer_value"> where id=unique value among all nodes class=default, agent, recipient, service, message, license name=descriptive text for node priority=this determines how the values in the node overwrite other nodes.

The node class determines the purpose of the information stored in the node. For example, if the node class is agent, then the node information is used to create an agent, which is the software module that delivers messages via a particular protocol and conduit. In one embodiment of the invention, the following node classes are utilized:

default: default configuration settings agent: the software module responsible for message deliver via a protocol and conduit recipient: a particular wireless device service: the carrier service the agent will connect to message: the message to be delivered license: the Messaging Engine license to allow delivery of the message.

Observe that these node classes allow the setting of default values through the "default" node class. The "agent" node class is used to specify a wireless message transport protocol and a wireless message transport conduit. The "recipient" node class specifies the wireless device that will receive the wireless transport message. The "service" rode specifies a wireless carrier 34. The "message" node has the data content corresponding to the data received in the network message. The "license" node allows controlled access to the messaging engine 20.

Per node class, second-level tags further define the node. These tags include information about the configuration, protocols, conduits, message content, node references, and license. Table 9 describes all of the tags used in accordance with an embodiment of the invention.

TABLE 9

| Tag | Node Class | Allowed in Description |
|---|---|---|
| <node> | N/A | Basic XML unit; All data is defined in terms of nodes |
| <config> | ALL | Configuration settings |
| <config_database> | default | Other database(s) that server communicates with value: dbtype:dbname:[hostname]:[tcpport], [user], [password], [priority] |
| <config_inqueuewait> | default, agent | Sleep time of epagemst module in milli-seconds |
| <config_outqueuewait> | default, agent | sleep time of epageagt module in milli-seconds |
| <config_batchhistory> | default, agent | Sets whether batch history is off, only errors logged, or full. Values: "none", "error", "full" |
| <config_msgpriority> | message | Priority of message. Determines how much time the message spends in queue. |
| <config_msggroup> | agent, message | The msggroup of the agent or message; used to only allow certain agents to delivery given message. |
| <license> | license | License settings |
| <license_program> | license | Licensed product, value is referred to as Kappa in this example. |
| <license_feature> | license | Expression that describes licensed features. |
| <license_warning> | license | Expression that determines when user will receive licensing warnings. |
| <license_version> | license | Product version that is licensed. |
| <license_date> | license | Expiration date of kappa. |

TABLE 9-continued

| Tag | Node Class | Allowed in Description |
|---|---|---|
| <license_comment> | license | String specified at license generation time. |
| <license_code> | license | Unique alphanumeric code that determines validity of license |
| <license_hostid> | license | The hostid of licensed Message Engine Server. |
| <reference> | recipient, service | A directed link to another node value: "merge", "expand" |

In a simplified embodiment of the invention, there are three major wireless transport protocol tags: dtmf, snpp and tap. Each tag corresponds to a different wireless transport protocol, namely dtmf, snpp, and tap. Although not shown, additional protocols have similar XML tags in the DTD. As new protocols are developed, XML tags are added to the DTD. The exemplary protocol tags may be defined as specified in Table 10.

TABLE 10

| <dtmf> | ALL | DTMF (touchtone) protocol settings |
|---|---|---|
| <dtmf_script> | ALL | Value to transmit after making connection |
| <dtmf_numberprefix> | ALL | Number to dial before main service number |
| <dtmf_number> | ALL | DTMF main service number |
| <dtmf_numberpostfix> | ALL | Number to dial after main service number |
| <snpp> | ALL | SNPP protocol setting |
| <snpp_maxlength> | ALL | Maximum character length of SNPP message |
| <snpp_splitlimit> | ALL | Maximum multipart message length (total character count allowed) |
| <snpp_toolong> | ALL | Defines long message handling values: "reject", "truncate" and "split" |
| <snpp_maxdeliveryattempt> | ALL | Determines the number of times an agent will attempt message delivery |
| <snpp_maxbatch> | ALL | Number of messages allowed to be delivered during given connection |
| <snpp_pin> | ALL | Recipient's pin number |
| <tap> | ALL | TAP protocol settings |
| <tap_parity> | ALL | Parity encoding for data connection |
| <tap_maxlength> | ALL | Maximum character length of TAP message |
| <tap_splitlimit> | ALL | Maximum multipart message length (total character count allowed) |
| <tap_toolong> | ALL | Defines long message handling values: "reject" "truncate" and "split" |
| <tap_maxdeliveryattempt> | ALL | Determines the number of times an agent will attempt message delivery |
| <tap_maxbatch> | ALL | Number of messages allowed to be delivered during given connection |
| <tap_pin> | ALL | Recipients pin number |
| <tap_password> | ALL | Password for the service provider |

In accordance with the invention, a set of wireless message transport conduit tags are also defined, including: tty, modem, tcp and forward. Each of these tags characterizes the medium (conduit) over which the message is sent. For each conduit supported in the future, a corresponding conduit tag will be added to the DTD. By way of example, the tags defined in accordance with an embodiment of the invention are shown in Table 11.

TABLE 11

| <tty> | ALL | tty (lease-line) conduit settings |
|---|---|---|
| <tty_device> | ALL | Serial port |
| <tty_speed> | ALL | Connection speed |
| <tty_databits> | ALL | Number of databits per byte value: "7", "8" |
| <tty_parity> | ALL | Parity encoding of data value "none", "even" "odd" |
| <tty_stopbits> | ALL | Number of bits to indicate stop value: "1", "2" |
| <tty_flow> | ALL | Data flow control method value: "none", "xonxoff", "rtscts" |
| <tty_lockdir> | ALL | Directory to store lock file (indicates tty in use) |
| <tty_maxconnectionattempt> | ALL | Maximum number of times to retry conduit connection |
| <modem> | ALL | Modem conduit settings |
| <modem_script> | ALL | Modem initialization string |
| <modem_numberprefix> | ALL | Number to dial before dialing service provide number |
| <modem_number> | ALL | Service provide number |
| <modem_numberpostfix> | ALL | Number to dial after dialing service provide number |
| <modem_device> | ALL | Serial port that modem is connected to |
| <modem_speed> | ALL | Modem connection speed |
| <modem_databits> | ALL | Number of databits per byte value: "7", "8" |
| <modem_parity> | ALL | Parity encoding of data value: "none", "even", "odd" |
| <modem_stopbits> | ALL | Number of bits to indicate stop value: "1", "2" |
| <modem_flow> | ALL | Data flow control method value: "none", "xonxoff", "rtscts" |
| <modem_lockdir> | ALL | Directory to store lock file (indicates modem in use) |
| <modem_hold> | ALL | Determines whether modem should hangup after value: "true", "false" |
| <modem_maxconnectattempt> | ALL | Maximum number of connection attempts before quitting |
| <tcp> | ALL | tcp conduit settings |
| <tcp_host> | ALL | tcp host to connect to |
| <tcp_port> | ALL | tcp port on host to connect to |
| <tcp_maxconnectattempt> | ALL | Maximum number of connection attempts before quitting. |
| <forward> | ALL | Proprietary forwarding conduit for inter-server communications |
| <forward_database> | ALL | Database to connect to |
| <forward_maxconnectattempt> | ALL | Maximum number of connection attempts |
| *** Message XML | | |
| <text> | message | Message text in plain text format |
| <binary> | message | Message in binary format |
| <attachment> | message | Arbitrary data sent with text. Not sent to wireless device, but forwarded through Messaging Engine with original message. |

The foregoing information is more fully appreciated in connection with some specific examples. A configuration file 80 for configuring the transformation database 22 contains a collection of nodes: one default node, one or more agent nodes, zero or more service nodes, zero or more recipient nodes, and one or more license nodes. For example, a default node may be defined as shown in Table 12.

TABLE 12

```
<node id="default" class="default" name="" priority="0">
  <config>
    <config_batchhistory>full</config_batchhistory>
    <configoutqueuewait>8000</config_outqueuewait>
    <config_inqueuewait>10000</config_inqueuewait>
  </config>
  <tap>
    <tap_maxbatch>5</tap_maxbatch>
  </tap>
</node>
```

The default node of Table 12 defines the global settings batchhistory, outqueuewait, inqueuewait, and the tap protocol's maxbatch. The batchhistory setting causes all agents to default to full batch logging. An agent can override its individual batchhistory setting if desired. The default agent sleep time (config_outqueuewait) is 8 seconds, for example, and the default master sleep time is 10 seconds, by way of example. In this example, all agents use the maxbatch setting of 5 unless overridden by another node involved in the message delivery (service, message, recipient, agent).

A service node may be defined as shown in Table 13.

TABLE 13

```
<node id="pagemart" class="service" name="PageMart NationWide Paging" priority="0">
  <tap>
    <tap_maxlength>250</tap_maxlength>
    <tap_maxbatch>3</tap_maxbatch>
  </tap>
  <modem>
    <modem_numberprefix>9w</modem_numberprefix>
    <modem number>1-800-864-9499</modem_number>
    <modem_speed>300</modem_speed>
  </modem>
</node>
```

The service node of Table 13 defines a service that uses the tap protocol and a modem conduit. The tap maxlength and maxbatch are defined particularly for this service as well as certain characteristics of the modem.

The recipient node may be defined in accordance with the description of Table 14.

TABLE 14

```
<node id="jdoe" class="recipient" name="Jane Doe" priority="0">
  <tap>
    <tap_pin>1664171</tap_in>
  </tap>
  <reference reftype="merge">pagemart</reference>
</node>
```

The recipient node of Table 14 defines a wireless device that connects via the tap protocol. The node uses the service whose node id is equal to "pagemart". The reference tag causes the "pagemart" node to be merged or pulled into this recipient node.

An example of an agent node is defined in Table 15.

TABLE 15

```
<node id="ttya" class="agent" name="Dial-Out for /dev/cu10p0" priority="0">
  <config>
    <config_outqueuewait>8000</config_outqueuewait>
```

TABLE 15-continued

```
  </config>
  <tap>
    <tap_maxdeliveryattempt>6</tap_maxdeliveryattempt>
    <tap_maxlength>225</tap_maxlength>
  </tap>
  <modem>
    <modem_numberprefix>9w</modem_numberprefix>
    <modem_device>/dev/cu10p0<modem_device>
    <modem_speed>2400</modem_speed>
    <modem_flow>none</modem_flow>
  </modem>
</node>
```

The agent node of Table 15 uses the tap protocol and modem conduit. The config, tap and modem settings can be overridden by the message, service, and recipient nodes (given they all have node priority="0").

The foregoing nodes provide an example of a configuration file 80 which is used to configure the configuration table 50. A network message utilizes the same DTD. Table 16 provides an example of a network message.

TABLE 16

```
<node id="msg0" class="message">
  <reference reftype="merge">jdoe</reference>
  <text>hello world</text>
</node>
```

The network message of Table 16 is initially routed to the message-in table 56. It is then processed by the expansion agent 24. In particular, the expansion agent parses the message and then expands it based upon the configuration information in the configuration table 50. In a preferred embodiment, this expansion operation entails the construction of a Directed Acyclic Graph (DAG), as demonstrated below. Information from the DAG is subsequently placed in the message-out table 58. In this simple example, the message recipient is jdoe. The recipient receives the message "hello world" at a wireless device.

Figure 5:
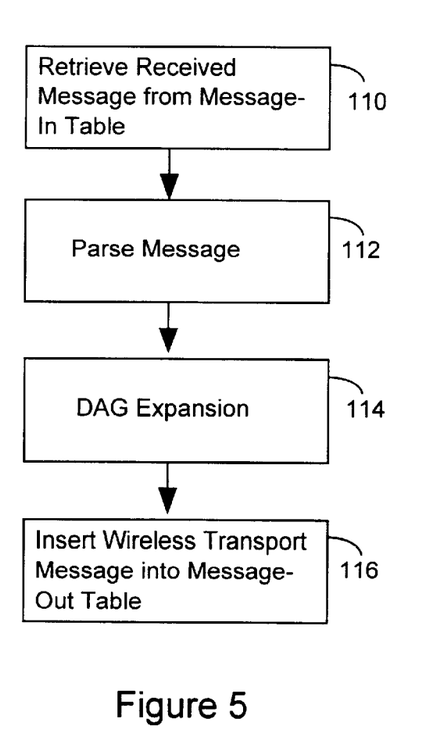
FIG. 5 illustrates processing steps performed by an expansion agent utilized in accordance with the invention.

The operation of the expansion agent 24 and delivery agents 26 are more fully appreciated with the following discussion. FIG. 5 illustrates processing steps performed by an expansion agent 24 of the invention. First, the expansion agent 24 retrieves a received message from the message-in table 56 (step 110). It then parses the message (step 112) and produces a DAG expression (step 112). The information from the DAG expression is then used to produce a wireless transport message that is inserted into the message-out table (step 116).

The expansion agent 24 delivers the wireless transport message to the message-out table 60. In particular, the expansion agent 24 inserts a wireless transport message entry into the message status table 60, the message protocol table 62, and the message conduit table 64. A delivery agent 26 extracts the message and other critical information from these tables in order to deliver the message successfully. Each delivery agent 26 is configured to only attempt delivery of messages that are compatible with its protocol and conduit. Each unique protocol has its own entries in the protocol table 62 which specifies how to deliver the specific message. Also, each unique conduit has its own entries in the message conduit table 64 which allows for customized conduit behavior per message.

The disclosed architecture allows many protocols and conduits to be developed quickly and with no disturbance to other parts of the software code base. Instead of designing the agents as a monolithic program, the agents are cleanly divided into protocol logic and conduit logic. Therefore, when a conduit is designed, any protocol will be able to use it and vice versa.

Preferably, the expansion agent 24 is configured to scan the message-in table 56 for new messages in user-definable intervals. When one or more new messages is detected, the expansion agent performs routine parsing of the message to extract the different components of the message. Once these components are obtained a DAG expression is formed. This entails the construction of a message-specific data structure that represents the hierarchy of information stored in the configuration nodes (recipient, service, alias, agent) related to the message. The final attributes of a message result from traversing the DAG data- structure, inheriting and possibly overriding attribute information until the traversal is complete.

Performing message elaboration using the DAG expansion technique of the invention allows for configuration settings to be distributed among different nodes and the ability for each message to essentially inherit its own custom settings.

The DAG datastructure has one node for every configuration node. When a message is processed, the DAG is expanded to the point where all node references are resolved, producing a flat list of values. In other words, the configuration is expanded from a single root node to a DAG structure. At this point, the DAG structure is traversed to select configuration values that are attached to child nodes up to the root node. At propagation completion, a flat list of values results. The flat list of values is embodied in the wireless transport message, as demonstrated in the examples provided below.

The node references utilize the previously discussed reference tags: merge and expand. The merge reference tag is used when a node needs to collect information from another node in order to complete its definition. The code in Table 17 illustrates a configuration node using a reference merge tag to indicate a recipient's service provider.

TABLE 17

```
<node id="msg0" class="message">
    <tap>
        <tap_pin>1234567</tap_pin>
    </tap>
    <reference reftype="merge">pagemart</reference>
    <text>hello world</text>
</node>
```

Expand references are used when a node (alias node) is grouping other nodes under a similar name. Table 18 illustrates the use of an expand reference to create a group.

TABLE 18

```
<node id="sysadmins" class="alias" name="Unix System Administrators" priority="0">
    <reference reftype="expand">dcoelho</reference>
    <reference reftype="expand">dbernstein</reference>
    <reference reftype="expand">prissmann</reference>
</node>
```

With this node in the specified configuration, users can send messages to "sysadmins" and prissmann, dcoelho, and dbernstein will each receive a message.

Expand references are also used in network messages, as shown in Table 19

TABLE 19

```
<node id="msgO2" class=message>
    <reference reftype="expand">prissmann</reference>   <text>message to prissmann</text>
</node>
OR
<node id="msg02" class=message>
    <reference reftype="expand">dbernstein</reference>
    <reference reftype "expand">prissmann</reference>
    <text>message to dbernstein and prissmann</text>
</node>
```

DAG expansion occurs until all node references are resolved and a final list of values result. When nodes in the DAG set the same attribute, by default, the parent node overrides child. This can be overridden by setting the priority field per node to dictate the weight of each node. The higher priority node will override a node of a lower priority. The expansion agent 24 includes a rule set to specify such rules as a node that contains expand references can be followed with merge references, but a merge reference cannot be followed with an expand reference.

Attention now turns to a more detailed example of a configuration file 80, a message that i processed in accordance with the information in the configuration file 80, the DAG expression resulting from this processing, and the wireless transport message produced by this processing. Table 20 illustrates an example configuration file 80.

TABLE 20

```
<?xml version="1.0"?>
<!DOCTYPE mobilesys SYSTEM "mobilesys.dtd">
<mobilesys>
    <node id="default" class="default" name="" priority="0">
        <modem>
            <modem_numberprefix>9w</modem_numberprefix>
            <modem_maxconnectattempt>5</modem_maxconnectattempt>
        </modem>
        <tap>
            <tap_maxdeliveryattempt>5</tap_maxdeliveryattempt>
            <tap_toolong>split</tap_toolong>
        </tap>
        <config>
            <config_msgpriority>7<config_msgpriority>
        </config>
    </node> *DAG Expression Node 202*
    <node id="marketing" class="group" name="Marketing Department" priority="0">
        <tap>
            <tap_toolong>reject</tap_toolong>
        </tap>
    </node> *DAG Expression Node 204*
    <node id="sales" class="group" name="Sales Department" priority="15">
        <tap>
            <tap_toolong>reject</tap_toolong>
        </tap>
    </node> *DAG Expression Node 206*
    <node id="digcellco" class="serviceprovider" name="DigCell, Inc." priority="10">
        <ois>
            <ois_majorver>4</ois_majorver>
        </ois>
        <pad>
            <pad_destaddr>23530000000000</pad_destaddr>
        </pad>
    </node> *DAG Expression Node 208*
    <node id="pageco" class="serviceprovider" name="Paging, Inc." priority="10">
        <tap>
            <tap_password>BEEPME</tap_password>
            <tap_toolong>split</tap_toolong>
        </tap>
```

TABLE 20-continued

```
</node> *DAG Expression Node 210*
<node id="cellsvcmv" class="service" name="DigCell - Mountain
View" priority="0">
    <ois>
    </ois>
    <pad>
        <pad_srcaddr>23535555555555</pad_srcaddr>
    </pad>
    <reference reftype="merge">digcellco</reference>
</node> *DAG Expression Node 212*
<node id="cellsvcsj" class="service" name="DigCell - San Jose"
priority="0">
    <ois>
    </ois>
    <pad>
        <pad_srcaddr>23531234567890</pad_srcaddr>
    </pad>
    <reference reftype="merge">digcellco</reference>
</node> *DAG Expression Node 214*
<node id="pagsvcmv" class="service" name="Paging - Mountain
View" priority="0">
    <tap></tap>
    <modem>
        <modem_number>1-650-555-9876</modem_number>
    </modem>
    <reference reftype="merge">pageco</reference>
</node> *DAG Expression Node 216*
<node id="pagsvcsj" class="service" name="Paging - San Jose"
priority="0">
    <tap></tap>
    <modem>
        <modem_number>1-408-555-5678</modem_number>
    </modem>
    <reference reftype="merge">pageco</reference>
</node> *DAG Expression Node 218*
<node id="wilma" class="recipient" name="Wilma Flintstone"
priority="0">
    <ois>
        <ois_smsdestaddr>16505554321</ois_smsdestaddr>
    </ois>
    <reference reftype="merge">cellsvcmv</reference>
    <reference reftype="merge>marketing</reference>
</node> *DAG Expression Node 220*
<node id="fred" class="recipient" name="Fred Flintstone"
priority="0">
    <tap>
        <tap_pin>2222222</tap_pin>
    </tap>
    <reference reftype="merge">pagsvcmv</reference>
    <reference reftype="merge">sales</reference>
</node> *DAG Expression Node 222*
<node id="barney" class="recipient" name="Barney Rubble"
priority="0">
    <tap>
        <tap_pin>1234567</tap_pin>
    </tap>
    <reference reftype="merge">pagsvcsj</reference>
    <reference reftype="merge">sales</reference>
</node> *DAG Expression Node 224*
<node id="betty" class="recipient" name="Betty Rubble" priority="0">
    <ois>
        <ois_smsdestaddr<14085551234</ois_smsdestaddr>
    </ois>
    <reference reftype="merge">cellsvcsj</reference>
    <reference reftype="merge>marketing</reference>
</node> *DAG Expression Node 226*
<node id="flintstones" class="alias" name="Flintstone alias"
priority="0">
    <reference reftype="expand">fred</reference>
    <reference reftype="expand">wilma</reference>
</node> *DAG Expression Node 228*
<node id="rubbles" class="alias" name="Rubble alias" priority="0">
    <reference reftype="expand">barney</reference>
    <reference reftype="expand">betty</reference>
</node> *DAG Expression Node 230*
</mobilesys>
```

By way of example, the network message of Table 21 is processed in accordance with the configuration file 80 of Table 20.

TABLE 21

```
<?xml version="1.0"?>
<!DOCTYPE mobilesys SYSTEM "mobilesys.dtd">
<mobilesys>
<node id="msgtorubbles" class="message" name="example message"
    <reference reftype="expand">rubbles</reference>
    <text>hello</text>
</node>
</mobilesys> *DAG Expression Node 240*
```

Figure 6:
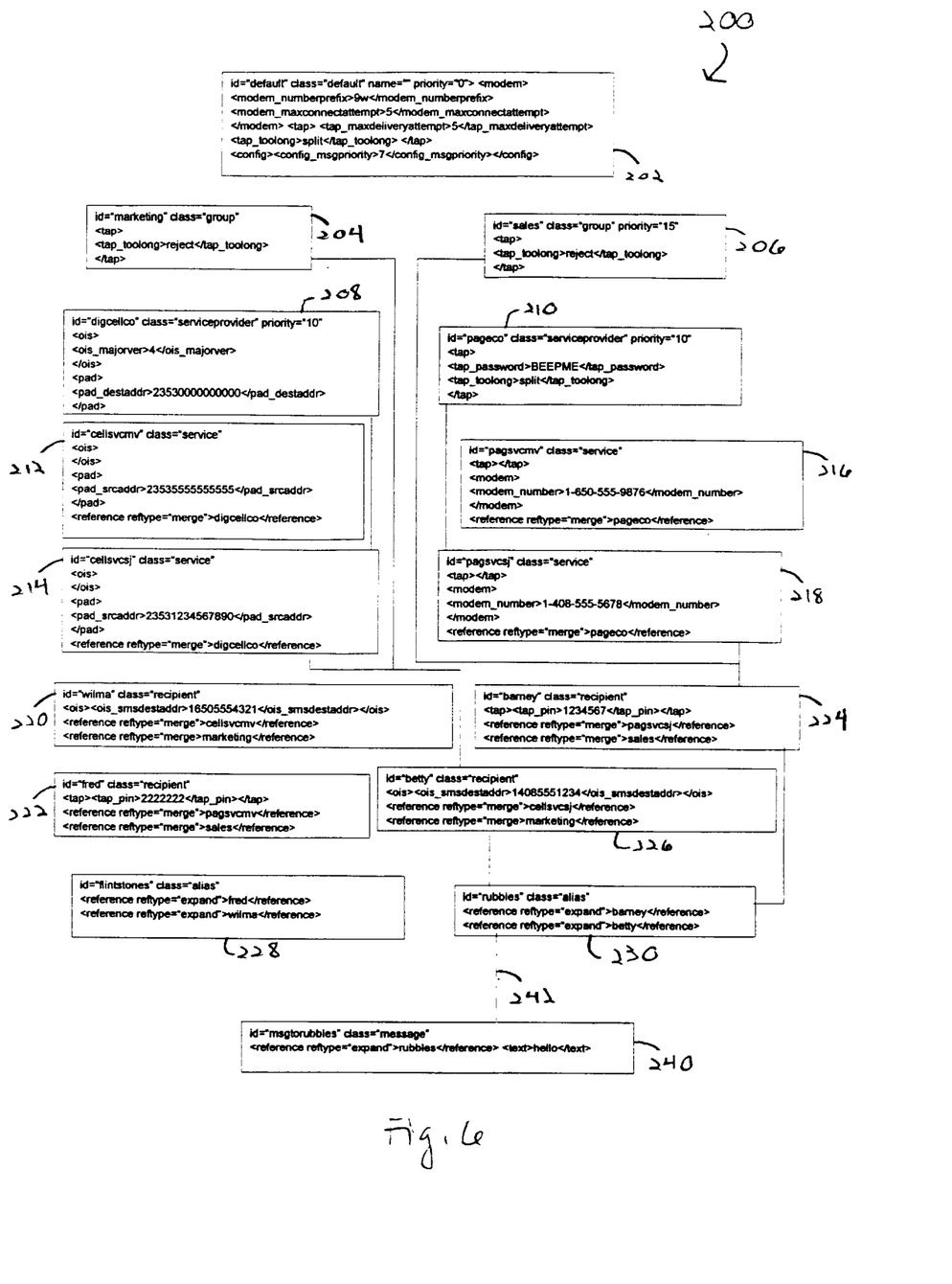
FIG. 6 illustrates a Directed Acyclic Graph formed by an expansion agent in accordance with an embodiment of the invention.

FIG. 6 illustrates a DAG expression 200 constructed in accordance with the information provided in Tables 20 and 21. Each block of code in Tables 20 and 21 is followed by a comment, delineated by *, indicating where the code is converted into the DAG expression 200. For example, the first block of code in Table 20 is the default node which appears as block 202 at the top of the DAG expression 200 of FIG. 6**.

The network message is marked as block 240 in FIG. 6. The code in block 240 specifies to "expand" the "rubbles" reference. Thus, a configuration link 242 is made to block 230, the root node of the DAG expression 200. The remaining links in the expression 200 are between configuration nodes. The code in block 230 specifies the "barney" reference, leading to a link to block 224. Block 224 leads to links to block 218 and 206. The link to block 218 leads to a link to block 210.

A different branch from the root node 230 is made via the reference to "betty", leading to a link with block 226. Block 226 specifies links to blocks 214 and 204. Block 214 specifies a link to block 208.

Observe that blocks 212, 216 220, 222, and 228 are not connected to the DAG expression 220. Instead, these blocks constitute information that is contained in the configuration table 50, but is not relevant to the processing of this particular message. The processing of a different message may produce a DAG expression that incorporates these nodes. Block 202, while not connected to the DAG expression, includes default settings that are accessed during the formation of the wireless transport message.

The DAG expression 200 is traversed by the expansion agent 24 to assign parameters to the wireless transport message resulting in the message of Table 22.

TABLE 22

```
<?xml version="1.0"?>
<!DOCTYPE mobilesys SYSTEM "mobilesys.dtd">
<mobilesys>
    <node id="msgtorubbles" class="message" name="example message"
        <tap>
            <tap_pin>1234567</tap_pin>
            <tap_password>BEEPME</tap_password>
            <tap_toolong>reject</tap_toolong>
            <tap_maxdeliveryattempt>5</tap_maxdeliveryattempt>
        </tap>
        <modem>
            <modem_number>1-408-555-5678</modem_number>
            <modem_numberprefix>9w</modem_numberprefix>
            <modem_maxconnectattempt>5</modem_maxconnectattempt>
        </modem>
        <config>
            <config_msgpriority>7</config_msgpriority>
```

TABLE 22-continued

```
    </config>
    <text>hello</text>
  </node>
</mobilesys>
```

Observe that this message was expanded from the part of the "rubbles" alias coded as <reference reftype="expand">barney</reference>. Note that the modem_numberprefix, modem_maxconnectattempt, tap_maxdeliveryattempt, and config_msgpriority values come from the default node 202. Also note that tap_toolong value comes from the sales node 206 because its priority is higher than the pagsvcsj node 218.

A second wireless transport message produced by the expansion agent 24 is shown in Table 23.

TABLE 23

```
<?xml version="1.0"?>
<!DOCTYPE mobilesys SYSTEM "mobilesys.dtd">
<mobilesys>
  <node id="msgtorubbles" class="message" name="example message">
    <ois>
      <ois_smsdestaddr>14085551234</ois_smsdestaddr>
    </ois>
    <pad>
      <pad_srcaddr>23531234567890</pad_srcaddr>
      <pad_destaddr>23530000000000</pad_destaddr>
    </pad>
    <config>
      <config_msgpriority>7</config_msgpriority>
    </config>
    <text>hello</text>
  </node>
</mobilesys>
```

The message of Table 23 was expanded from the part of the rubbles alias coded as <reference reftype="expand">betty</reference>. Note that the modem_numberprefix, modem_maxconnectattempt, tap_maxdeliveryattempt, and config_msgpriority values come from the default node 202.

The expansion agent 24 has now been fully described, attention now turns to a discussion of the operation of the delivery agents 26. When an agent 26 initiates a message delivery, it generally opens the conduit, then opens the protocol. When the agent completes a delivery it closes the protocol and then closes the conduit. The delivery agents are preferably configured to perform the functions described below.

One such function is an initialization function to start a protocol or conduit and perform any initialization actions necessary before use of the protocol or conduit. Typical input to this function is a protocol/conduit identification number, a debug level, and an agent name. A modifiable input associated with this function is the protocol/conduit state.

Another function executed by the delivery agents is a clean-up function. This function stops a protocol or conduit and performs any actions necessary to cleanly shut down the protocol or conduit. Input to the function is a protocol or conduit identification number. A modifiable input associated with the function is the protocol/conduit state.

Another function is a configuration function to configure a protocol or conduit. This function secures default configuration information and agent-specific configuration information; thereafter, it places the agent in a state to start handling messages. The input to this function is a protocol/conduit identification number, agent or master name, default values for DAG expansion, and specific configuration for the agent. A modifiable input associated with the function is the protocol/conduit state. The output of the function is a boolean value indicating success or failure of the configuration operation.

A check function may also be performed in accordance with the invention. The check function performs protocol/conduit-specific checking on an individual message. The input to the function is a protocol/conduit identification number, a string submitted with a message as its identifier, and post-DAG expansion name-value pairs describing the message. A modifiable input to the function is the protocol/conduit state. The output of the function is a boolean indicator of success or failure.

A split function may also be used in accordance with the invention. The split function splits a single message into one or more messages. The input to this function is a protocol/conduit identification number, a string submitted with the message as its identifier, post-DAG expansion name-value pairs describing the message, the original text of the message, and the length of the original text of message. The modifiable input for this function is the protocol/conduit state. The output of the function is an error message, if any; an error code, if any; an array of messages, all of legal length (less than or equal to constraint size); the number of messages that the input was split into; and a boolean value of function success.

A write function is also provided in a preferred embodiment. The write function operates to write message information to transformation database 22. The input to this function is a protocol/conduit identification number, a partner protocol/conduit identification number, a partner protocol/conduit state, a string submitted with the message as its identifier, a system-generated string submitted with the message as its identifier, post-DAG expansion name value pairs describing the message, and an index of the message in the message status table 60. A modifiable input to the function is the protocol/conduit state. The output of the write function includes an error message, if any; error code, if any; protocol/conduit-specific string representation of the recipient; protocol/conduit-specific string representation of the service; and a boolean value of function success.

A batch function may also be used in accordance with an embodiment of the invention. The batch function secures protocol/conduit-specific preferences for how to handle a group of messages. The input to this function is a protocol/conduit identification number, a partner protocol/conduit identification number, a partner protocol/conduit state, an array of indices into the message status table of messages to batch, and the size of the array of indices into the message status table of messages to batch. A modifiable input to the function is the protocol/conduit state. The output of the function is a service mode: batching unavailable, dedicated service, multiple service, or one at a time; a recipient mode: batching unavailable, dedicated recipient, multiple service, or one at a time; a preferred service, if any; a preferred recipient, if any; and a boolean value of function success.

The open function operates to open a protocol/conduit session. This function may be used send messages. The input to the function is a protocol/conduit identification number, a partner protocol/conduit identification number, a partner protocol/conduit state, an array of indices into the message status table of messages to batch; and the size of the array of indices into the message status table of messages to batch. The modifiable input of the function is the protocol/conduit state, the array of session file descriptors, and the size of the array of session file descriptors. The output of the function is a boolean value of function success.

A close function is also provided to close a protocol/conduit session. This function can also be used to send messages prior to closing operations. The input to the function is a protocol/conduit identification number, a partner protocol/conduit identification number, a partner protocol/conduit state, and a boolean indication of session success. Modifiable input to the function includes a protocol/conduit state, an array of session file descriptors, and a size of array of session file descriptors. The output of the function is a boolean indicator of session success.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

In the claims:

1. A system to convert a network message into a wireless transport message, comprising:
    a network-to-wireless transformation database including a message configuration table, the message configuration table including a plurality of configuration nodes wherein at least a subset of the configuration nodes specify message handling attributes;
    an expansion agent configured to create a wireless transport message from a network message received from a network source, the received network message including message information and a configuration node identifier for identifying a root configuration node, by:
        constructing a directed acyclic graph (DAG) having a set of DAG nodes, in accordance with information from the configuration nodes and the received network message, each DAG node being associated with a respective configuration node;
        traversing the DAG starting at the DAG node associated with the identified root configuration node to select a set of message handling attributes, including a selected wireless message transport protocol and a selected wireless message transport conduit; and
        combining the selected set of message handling attributes with the message information;
    a message-out structure for storing the wireless transport message; and
    at least one message delivery mechanism for processing the wireless transport message from the message-out structure in accordance with the selected set of message handling attributes.

2. The system of claim 1, wherein the network source is selected from the group consisting of an electronic mail source, a web page source, a database source, a monitoring system source and a wireless receiver.

3. The system of claim 1 wherein each configuration node is defined by a first level node tag that specifies a unique identity and at least one of the following node classes: default, agent, recipient, service, message, and license.

4. The system of claim 3 wherein at least one of the configuration nodes has a second level tag that includes information about at least one of the following node characteristics: configuration, protocols, conduits, message content, node references, and license.

5. The system of claim 1 wherein the network-to-wireless transformation database includes a message-in table to receive the network message and the expansion agent processes the network message from the message-in table.

6. The system of claim 1 wherein the message-out structure includes a message status structure characterizing message parameters associated with the wireless transport message.

7. The system of claim 1 wherein the network-to-wireless transformation database includes an historical status structure to record delivery status of the wireless transport message.

8. The system of claim 1 wherein:
    the network-to-wireless transformation database includes a protocol table and a conduit table;
    each of the wireless message transport conduits supports a plurality of the wireless message transport protocols;
    the protocol table includes a plurality of protocol entries, each protocol entry for one of the wireless message transport protocols supported by the network-to-wireless transformation database;
    the conduit table includes a plurality of conduit entries, each conduit entry for one of the wireless message transport conduits supported by the network-to-wireless transformation database; and
    the conduit entries are independent of the protocol entries.

9. The system of claim 1 wherein the at least one message delivery mechanism includes a first persistent message delivery mechanism that supports only a single pre-determined wireless message transport protocol and a single pre-determined wireless message transport conduit.

10. The system of claim 1 wherein the at least one message delivery mechanism includes a plurality of distinct persistent message delivery mechanisms, each of which supports only a respective single wireless message transport protocol and a respective single wireless message transport conduit, each of the distinct message delivery mechanisms supporting a distinct protocol and conduit combination.

11. The system of claim 1 wherein the at least one message delivery mechanism includes at least one of the following functions: an initialization function, a clean-up function, a configuration function, a check function, a split function, a write function, a batch function, an open function and a close function.

12. The method of converting a network message into a wireless transport message, comprising:
    receiving a network message from a network source, the received network message including message information and a configuration node identifier for identifying a root configuration node;
    creating a wireless transport message by:
        constructing a directed acyclic graph (DAG) having a plurality of DAG nodes, in accordance with information from configuration nodes in a message configuration table and the received network message, each DAG node associated with a respective configuration node; and combining the message information with a set of message handling attributes selected by traversing the directed acyclic graph starting at the DAG node associated with the identified root configuration node, the selected set of message handling attributes including a selected wireless message transport protocol and a selected wireless message transport conduit;

storing the wireless transport message in a message-out structure; and processing the wireless transport message from the message-out structure in accordance with the selected set of message handling attributes.

13. The method of claim 12 further comprising delivering the wireless transport message to a selected conduit corresponding to the selected wireless message transport conduit.

14. The method of claim 12 further comprising recording delivery status information for the wireless transport message.

15. The method of claim 12 wherein the processing the wireless transport message includes selecting one message delivery mechanism of a plurality of distinct respective message delivery mechanisms, each of which supports only a respective single wireless message transport protocol and a respective single wireless message transport conduit.

16. A system to convert a network message into a wireless transport message, comprising:

a network-to-wireless transformation database including a message configuration table, the message configuration table including a plurality of nodes containing information for assembling the nodes into a plurality of acyclic graphs; at least a subset of the nodes in the message configuration table specifying message handling attributes;

an expansion agent to select a set of message handling attributes for a network message received from a network source, the received network message including message information and at least one node identifier for identifying at least one root node in the message configuration table, by:

processing nodes in the message configuration table reachable by traversing at least one of the acyclic graphs starting at the at least one identified root node; and including message handling attributes, comprising a selected wireless message transport protocol and a selected wireless message transport conduit, specified by the processed nodes in the selected set of message handling attributes;

a message-out structure for storing the message information and the selected set of message handling attributes; and at least one message delivery mechanism coupled to the message-out structure for delivering a wireless transport message in accordance with the message information and the selected set of message handling attributes stored in the message-out structure.

17. The system of claim 16, wherein the expansion agent is configured to:

generate an acyclic graph for the network message, the generated acyclic graph comprising nodes in the message configuration table reachable by traversing at least one of the acyclic graphs starting at the at least one root node identified by the received network message; and process nodes of the generated acyclic graph to generate the selected set of message handling attributes.

18. The system of claim 16, wherein the network source is selected from the group consisting of an electronic mail source, a web page source, a database source, a monitoring system source and a wireless receiver.

19. The system of claim 16 wherein each node is defined by a first level node tag that specifies a unique identity and at least one of the following node classes: default, agent, recipient, service, message, and license.

20. The system of claim 19 wherein at least one of the nodes has a second level tag that includes information about at least one of the following node characteristics: configuration, protocols, conduits, message content, node references, and license.

21. The system of claim 16 wherein the network-to-wireless transformation database includes a message-in table to receive the network message and the expansion agent processes the network message from the message-in table.

22. The system of claim 16 wherein the message-out structure includes a message status structure characterizing message parameters associated with the wireless transport message.

23. The system of claim 16 wherein the network-to-wireless transformation database includes an historical status structure to record delivery status of the wireless transport message.

24. The system of claim 16 wherein:

the network-to-wireless transformation database includes a protocol table and a conduit table;

each of the wireless message transport conduits supports a plurality of the wireless message transport protocols;

the protocol table includes a plurality of protocol entries, each protocol entry for one of the wireless message transport protocols supported by the network-to-wireless transformation database;

the conduit table includes a plurality of conduit entries, each conduit entry for one of the wireless message transport conduits supported by the network-to-wireless transformation database; and the conduit entries are independent of the protocol entries.

25. The system of claim 16 wherein the at least one message delivery mechanism includes a first message delivery mechanism that supports only a single pre-determined wireless message transport protocol and a single pre-determined wireless message transport conduit.

26. The system of claim 16 wherein the at least one message delivery mechanism includes a plurality of distinct message delivery mechanisms, each of which supports only a respective single wireless message transport protocol and a respective single wireless message transport conduit, each of the distinct message delivery mechanisms supporting a distinct protocol and conduit combination.

27. The system of claim 16 wherein the at least one message delivery mechanism includes at least one of the following functions: an initialization function, a clean-up function, a configuration function, a check function, a split function, a write function, a batch function, an open function and a close function.

28. The method of converting a network message into a wireless transport message, comprising:

receiving a network message from a network source, the network message including message information and at least one node identifier for identifying at least one root node in the message configuration table;

selecting a set of message handling attributes for the network message by:

processing nodes in a message configuration table, a plurality of the nodes containing information for assembling the nodes into a plurality of acyclic graphs, the processed nodes comprising nodes reachable by traversing at least one of the acyclic graphs starting at the at least one identified root node; and including message handling attributes, comprising a selected wireless message transport protocol and a selected wireless message transport conduit, specified by the processed nodes in the selected set of message handling attributes;

storing the message information and the selected set of message handling attributes in a message-out structure; and delivering a wireless transport message in accordance with the message information and the selected set of message handling attributes stored in the message-out structure.

29. The method of claim 28 further comprising recording delivery status information for the wireless transport message.

30. The method of claim 28 wherein the delivering the wireless transport message includes selecting one message delivery mechanism of a plurality of distinct respective message delivery mechanisms, each of which supports only a respective single wireless message transport protocol and a respective single wireless message transport conduit.

* * * * *